March 3, 1953 M. B. LUCKER 2,630,296
AUTOMOBILE JACK
Filed July 28, 1950 2 SHEETS—SHEET 1
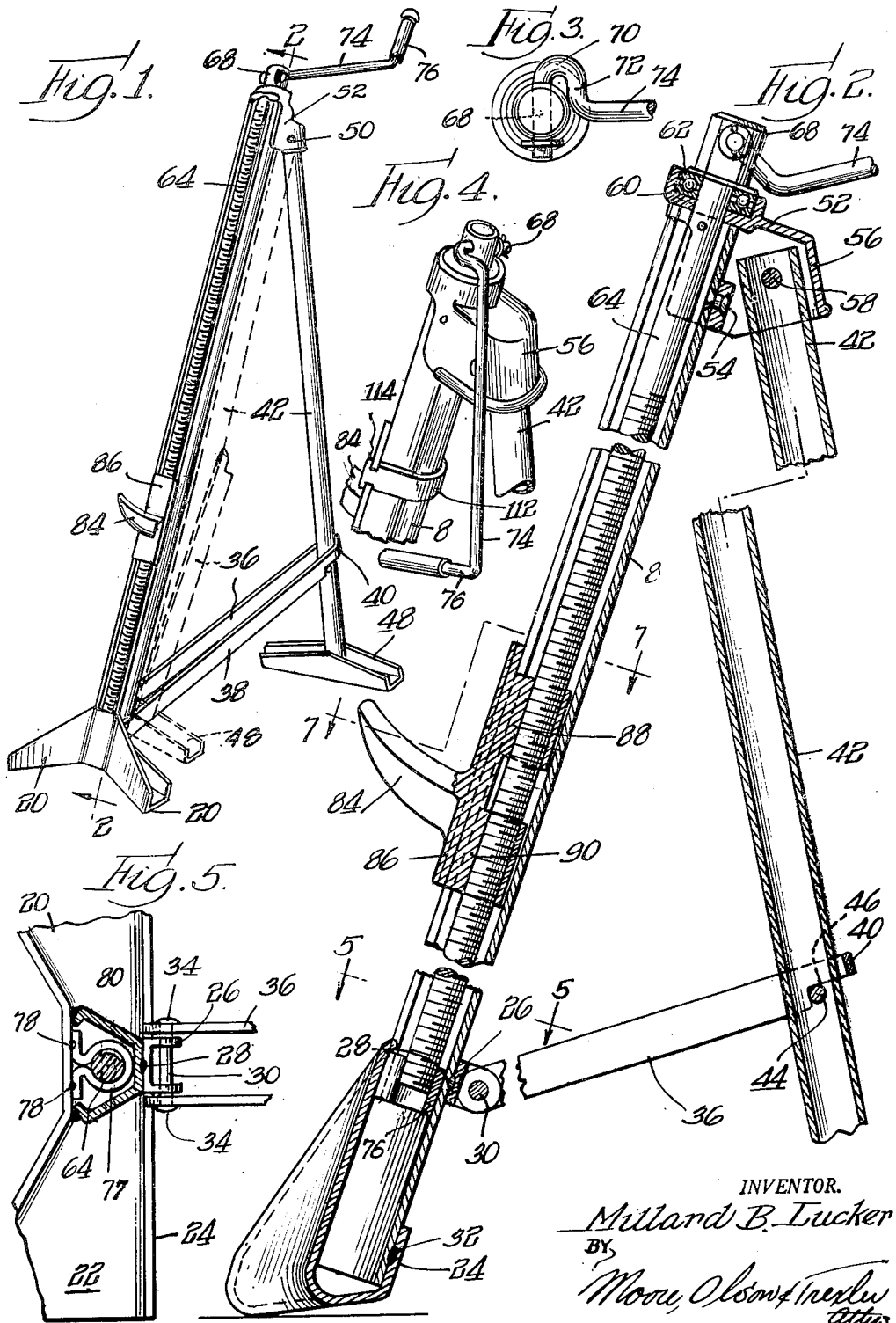
INVENTOR.
Millard B. Lucker
BY
Moore, Olson & Trexler
Attys March 3, 1953   M. B. LUCKER   2,630,296
AUTOMOBILE JACK
Filed July 28, 1950   2 SHEETS—SHEET 2
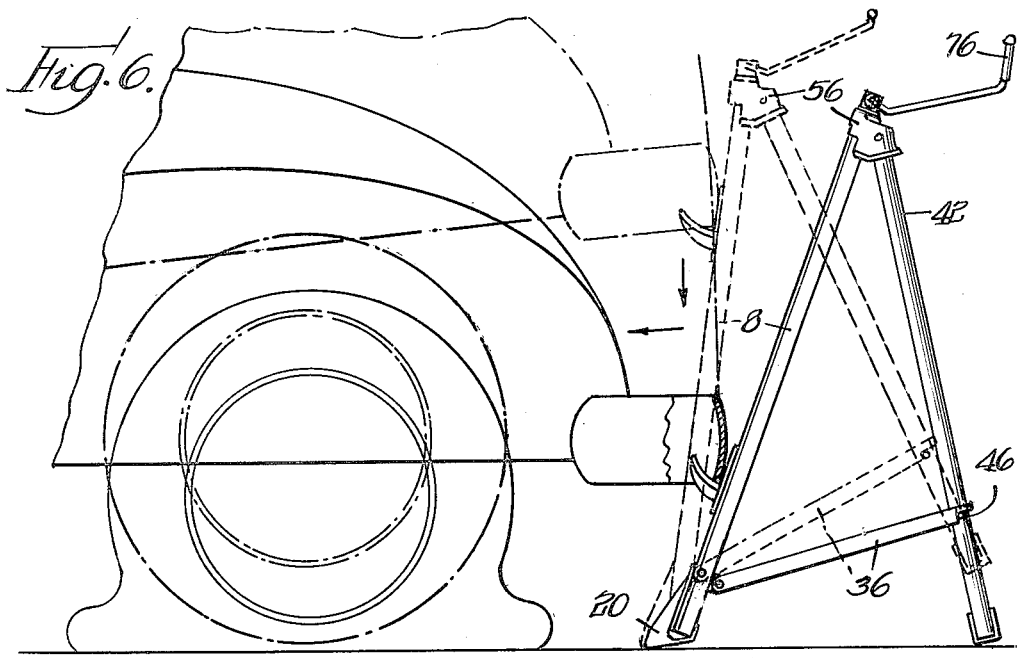
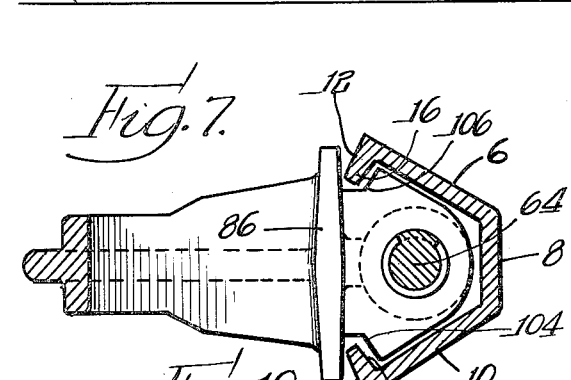
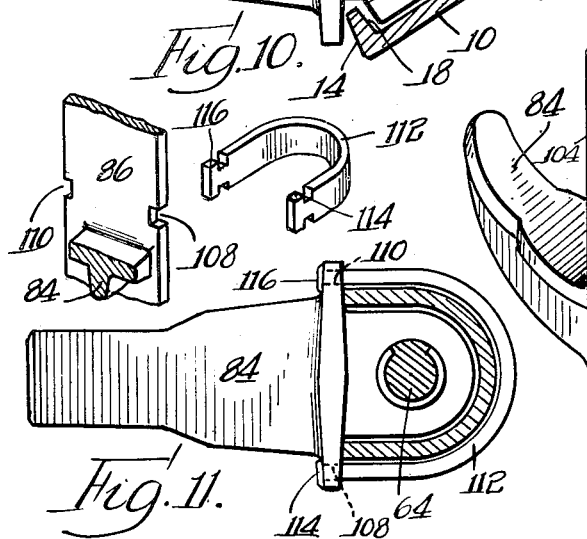
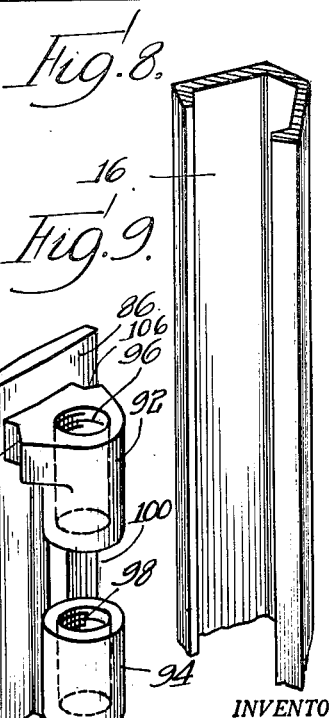
INVENTOR.
BY Millard B. Lucker
Moore, Olson & Trexler
attys.

Patented Mar. 3, 1953

2,630,296

UNITED STATES PATENT OFFICE 2,630,296

AUTOMOBILE JACK

Millard B. Lucker, St. Joseph, Mich., assignor to Auto Specialties Manufacturing Co., St. Joseph, Mich., a corporation of Michigan Application July 28, 1950, Serial No. 176,322

8 Claims. (Cl. 254—99)

This invention relates to automobile jacks and more particularly to the type where a load lifting member is raised up an upright strut by a screw contained in the strut.

Heretofore difficulties have been encountered in such jacks in that the load tended to tip the load carrying member and hence to shift the load carrying member away from the strut resulting in deformation of the screw, binding of the screw and load carrying member, and excessive wear of the coupling between the screw and load carrying member.

An object of this invention is to provide an automobile jack wherein the lifting screw is relatively weak but strong enough to sustain the axial component of a load lifted by the jack and wherein the load lifting member is coupled to the strut in such manner that the strut carries all transverse load components with no transverse strain being imposed on the screw.

A more particular object of this invention is to provide an automobile jack having a channel shaped strut, a load lifting member shiftable along said strut, and a screw housed in the strut for actuating the load lifting member wherein a part of the load carrying member or a structure fixed to such member extends rearwardly of a portion of the strut to transmit transverse strain to the strut rather than to the screw.

A load lifted by a jack of the character hereinbefore referred to tends to tip the top of the load carrying member away from the strut. Accordingly it is a particular object of this invention to provide means only near the top of the load lifting member for restraining outward movement thereof away from the strut. It has been found that the small contacting area of the restraining means results in decreased operating friction although theoretically friction depends only upon the normal force urging two surfaces together and on the coefficient of friction between the surfaces. It is believed that the friction decreases in the face of theory due to irregularities in the surfaces and in adhesion between the surfaces.

A further object of this invention is to couple a load lifting member to a lifting screw by means of a pair of bosses spaced apart axially of the screw.

A further object of this invention is to provide, in a jack of the type heretofore set forth, a combination ball bearing mount and bracket for pivotally connecting a brace or supporting leg.

Another object of this invention is to provide a jack strut formed of rerolled steel railroad rails.

These and other objects of the invention will become more apparent in connection with the accompanying drawings wherein:

Figure 1 is a perspective view of one embodiment of the jack embodying the invention;

Figure 2 is a side sectional view showing a portion of the construction;

Figure 3 is a top view showing the manner of attaching the crank to the top of the screw rod;

Figure 4 is a perspective view of the upper portion of the handle shown in folded down position;

Figure 5 is a plan section taken on line 5—5 of Figure 2;

Figure 6 is a side view showing the application of one of the jacks to the rear bumper of an automobile for lifting the same;

Figure 7 is a section on line 7—7 of Figure 2;

Figure 8 is a perspective view of the channel shaped strut used in the present invention;

Figure 9 is a perspective view taken from the rear face of the load lifting member;

Figure 10 is a view of two of the members of an alternative form of means for holding the central portion of the screw rod from outward bowing during the application of the heavy load. In Figure 10 one of the parts is shown in section;

Figure 11 shows wherein the strap portion, shown in Figure 10, applies to the load lifting member and embraces the rear wall of the channel shaped strut.

Referring now to the drawings in detail, the jack may comprise one upstanding leg or two upstanding legs or three upstanding legs. In the present invention the jack is illustrated as including two upstanding legs. One of the upstanding legs is preferably formed as a channel having sides 6, 8 and 10. This channel member is a rugged strut element and is sufficiently strong to support the load of the automobile being lifted. It is formed from rerolled rail steel.

In the cross sectional form illustrated in Figure 7 it will be noted that the side walls of this strut which are 6 and 10 are disposed substantially at a right angle the one to the other and are joined by a common interconnecting wall 8. The outer extremities of the walls 6 and 10 are each provided with an inturned flange 12 and 14. These flanged walls lie substantially at a right angle the one to the other and provide inner wall faces 16 and 18. A very generous elongated opening is provided between faces 16 and 18 of the channel strut member.

As before stated, the elongated strut is of sufficient length to suitably raise a car by means of a load engaging member engaging the bumper of the automobile as shown in Figure 6. The bottom part of the strut is provided with a foot which is of the shape shown in Figure 1. It comprises in general a shape of sheet metal suitably bent to provide two diagonally disposed outstanding feet 20. These feet are of trough-shape as shown in Figures 1 and 5, to include a bottom flat portion 22 and a rear upstanding wall 24. This foot is suitably welded to portions of the upstanding strut. In addition, suitably welded also to the rear face feet of the upstanding strut is a U-shaped bracket 26 having rearwardly extending flanges. This bracket is welded as at 28 near the feet of the strut at the bottom thereof, that is, at a distance substantially raised above the bottom of the strut as shown better in Figure 2 where the strap 26 is shown as welded as at 28 to the rear wall 8 of the channel strut. The wall 24 is welded as at 32 to the rear wall 8 of this strut. A suitable pivotal pin 30 having the opposite heads 34 passes through openings in the bracket 26 and also through openings in a parallel strap member 36. The strap member has parallel sides to provide a rounded end 40 which embraces or lies over the wall of a tubular rear leg 42. A pin 44 passes through the leg and provides a stop for a shouldered portion 46 on the strap 36. The rear leg 42 is provided at the bottom portion with a cross foot 48 which is suitably welded thereto and the upper portion of this leg 42 is pivotally mounted by pin 50 in a combined bracket and bearing 52. This bracket and bearing is suitably riveted as at 54 to the rear wall 8 of the strut and forms a rearwardly extending hollow cap portion 56 through which the pivot pin 50 passes that pivotally links the bracket 52 with the leg 42. In addition, the bracket or cap-like structure 52 is provided with a shallow disc-like portion 60 which receives the ball bearing 62. This ball bearing forms means for rotatably supporting the upper end of an elongated screw 64. This screw extends longitudinally of the channel and is provided at its free end with an opening through which passes the inner end 68 of a handle. The outer end of the handle is provided with an opening through which a cotter pin is fixed to hold in place a washer as shown in Figures 2 and 3. The outer end of the handle is turned and constructed and arranged in the manner set forth in my prior application 63,367, filed December 3, 1948. In general, this handle is provided with a sharply folded gooseneck portion 70 which terminates in a portion 72 lying substantially parallel with the end portion 68 and a portion 74 which is bent at right angles to the portion 72. Portion 74 extends outwardly in an elongated fashion and then is provided at its outer end with an angularly bent handle 76, by which construction the handle may either be turned to the position shown in Figure 3 for rotating the screw or may be folded down to the position shown in Figure 4 where the elongated shank 74 lies substantially alongside the leg member 42 or the strut when the strut is folded into closely contacting position. It will be noted that the portions 72 and 68 lie substantially in a common plane whereas the shank portion 74 rises upwardly angularly with respect to this plane at an angle of about 45° or more. Illustration of this shank portion 74 is shown in Figure 2.

The elongated screw 64 is of diameter shown particularly in Figures 5 and 7 as being relatively smaller than the cross sectional area of the space included by the walls 6, 8 and 10 of the channel strut member. In other words, the diameter of this screw rod is relatively small compared to the cross sectional interior opening of th channel strut whereby to permit the substantial housing in this channel strut, of a load lifting member which is operative to be moved longitudinally of and by the screw rod during the operation of the jack whereby to raise and lower the load. The bottom end of the screw-fitted rod 64 is positioned in the bottom of the strut leg by means of a bracket member 77 as shown in Figure 5. This bracket member is welded as at 78 to the front wall of the foot and has a circular portion 80 which embraces the bottom portion of the screw rod 64. The bracket member permits relative movement of the lower portion of the screw rod outwardly with respect to the channel member. This pendant movement of the screw in and relatively to the strut member is only a limited movement but of sufficient extent to insure that the weight of the load on the lifting member is transmitted directly to the strut and not to the screw.

The load lifting member itself comprises a malleable iron elongated load lifting support 84 preferably in the form of a horn but any type or style of load lifting member may be utilized. This is preferably formed although not necessarily formed, either or with an elongated plate-like member 86 which is usually formed at its rear end with two rearwardly extending bosses 88 and 90. Each of these bosses is formed with a sort of a semi-cylindrical barrel shaped bearing 92 and 94 which is bored and threaded as at 96 and 98 to receive the elongated screw rod 64 therethrough. Attention is called to the space 100 formed between the cylindrical bearings 92 and 94 which permits the discharge of grease or dirt and also permits the bearings 92 and 94 to be bored and threaded.

Means is provided in association with the elongated strut member and the load lifting member for maintaining the load lifting member from inordinate outward movement when a load is borne by the horn or load support 84. In the simple type and preferred form of the invention this is accomplished by providing the inner portion of block 86 of the load lifting member, the same being that portion that carries the bearings 92 and 94, with the surfaces 104, 106 which contact the surfaces 16 and 18 forming the inner surfaces of the flanges 12 and 14 of the channel strut whereby as the load goes on the load support 84, the load will be downwardly and outwardly and the surfaces 104 and 106 will contact the surfaces 18 and 16 and prevent excessive outward movement of the inner portion 102 of the load block. It should be noted that, as is clearly shown in Fig. 7, the spacing between the surfaces 104 and 106 and the rear surface of the plate-like member 86 is such as to permit the load lifting member and the screw rod to have some movement backwardly and forwardly or laterally relative to the channel strut. Also, the peripheral shape and cross sectional area of the bearings 92 and 94 is such as to allow this movement. This structure along with the above described pendant mounting of the screw rod tends to prevent the possibility of binding between the load lifting member and either the screw rod or the interior surfaces of the channel-shaped strut while still insuring that either the surfaces 104 and 106 or the rear surface of the plate member 86 will transmit transverse forces directly to the strut. Furthermore, it should be noted that the inner surfaces 16 and 18 of the flanges 12 and 14 are disposed at an angle to each other, which angle is preferably about 90°. The surfaces 104 and 106 are disposed similarly to the surfaces 16 and 18, and it is readily seen that upon engagement of these surfaces their inclines will tend to center the load lifting member within the channel strut, thereby eliminating uneven forces which tend to bind the parts or twist the jack.

In another form of the invention shown in Figures 10 and 11 and also in Figure 4, a plate 86 of the load lifting member is provided with a pair of notches as shown at 108 and 110 and a band 112 is provided having suitably formed slotted ends 114 and 116 which engage in the notches 108 and 110 and are suitably peened in position or bend in position as shown in Figure 11. The band embraces the rear portion of the channel seat rear wall 8 of the channel seat strut which functions as a means for preventing the upward movement of the load lifting block away from and/or out of the channel strut and thereby holds the screw rod 64 in position within the channel strut. This thereby prevents a binding of the jack in operation and also prevents an excessive bending of the screw rod. It should be noted, however, that the band 112 is sufficiently large, as clearly shown in Fig. 11, so as to permit some lateral movement of the load lifting member and the screw rod relative to the strut to reduce the possibility of binding between these parts.

It will thus be appreciated that by reason of the foregoing construction I have provided a jack wherein a rigid metallic steel strut preferably formed but not necessarily, of rerolled steel railroad rails, of channel-shaped cross section whereby said strut has itself the inherent strength and rigidity to sustain the load of the part to be lifted and wherein by its elongated channel-shaped strut it substantially houses an elongated screw rod and wherein a relatively rigid load carrier or lifter, preferably of malleable iron, threadedly engages the screw and is shifted along the erect strut by rotation of the screw in a manner such that the weight of the relatively heavy load is transmitted directly to the walls of the rigid strut and not to the screw so that a screw of relatively small diameter may be used thereby saving much expense of construction and materials.

The means for holding the strut in erect position may comprise an additional leg or legs, preferably pivotally connected to an upper portion of the strut for compact folding together for storage and where crank means for rotating the screw may shift either to a position lying adjacent the strut or shifted to open position to act as a turning crank.

Further, means is provided for preventing the outward bowing or bending of the long screw rod relatively to its channel housing during the application of the relatively heavy load and for also pendantly mounting the elongated screw in its channel strut so that the screw may shift relatively thereto on application of the load to the load lifter so that the weight of the load on the lifter is directly carried by the walls of the strut and not by the relatively frail screw.

In addition, the construction of the upper pivotal connection between the strut and the leg means for foldably supporting the strut in erect position provides means forming also a bearing for rotatably mounting the screw in and relatively to the strut housing for the screw and also provides an association with the lower bearing for the screw, means forming a pendant mounting for the screw in its housing permitting the screw to shift relatively to its strut housing so that the load on the load support is directly transmitted to the rigid strut and not carried by the long rotatable screw.

The foregoing construction permits the use of an open channel-shaped strut which may be formed by rerolling a steel railroad rail in such a manner as to provide an economical cross sectional shaped strut providing necessary rigidity and strength to carry the load, and yet form an adequate housing for enclosing and supporting the rotatable screw rod and the load carrying member threadedly engaging the screw through the elongated open face of the channel section while dirt and grease are shielded from the operator during use of the jack.

Having described the invention, what I claim as new and desire to secure by Letters Patent is:

1. A strut for an automobile lifting jack consisting of elongated channel-members having side walls spaced apart and located and disposed at an acute angle the one to the other, said side walls being joined by a rear wall, the front edges of said side walls being spaced apart and being formed with inwardly extending relatively short flanges, the projections of the outer faces of which lie substantially at right angles the one to the other, the thickness of the walls of said channel strut-like member being sufficiently thick to provide rigidity and strength to sustain the load of one end of an automobile.

2. An automobile jack, comprising an elongated rigid strut having a generally channel-shaped cross section to provide an elongated housing, an elongated screw rod disposed within said housing, bracket means mounted on an upper end portion of said channel-shaped strut, said bracket means including a portion formed as a bearing supporting member, bearing means disposed on said bearing supporting member for rotatably supporting said screw rod adjacent its upper end portion, said bracket means having an extension, a leg member connected to said extension of said bracket means for supporting said strut in a generally upright position, means for rotating said screw rod, and load lifting means threadedly engaging said screw rod and movable thereon upon rotation of said screw rod.

3. A load lifting jack, comprising a substantially channel-shaped strut member, a bracket member attached to an upper end portion of said channel-shaped strut member, said bracket member encircling said strut member at the upper end thereof and extending downwardly therefrom with a slot aligned with an open side of the channel-shaped strut member, a leg pivotally attached to said bracket member for supporting said channel-shaped strut member in an operative position, a bearing member mounted on said bracket member at the upper end thereof, a threaded rod positioned in said channel-shaped member and supported by said bearing member, and a load lifting member threadedly mounted on said rod for movement longitudinally thereof when said rod is rotated.

4. An automobile lifting jack, comprising an elongated strut having a generally channel-shaped cross section, said strut including a pair of spaced side walls and having an elongated frontal opening, elongated flange means extending inwardly from frontal longitudinal edge portions of each of said walls, an elongated screw rod rotatably mounted within said strut, means for rotating said screw rod, a load lifting member having a portion disposed within said strut and threadedly engaging said screw rod for movement along said screw rod upon rotation thereof, said load lifting member having another portion extending forwardly of said strut for engagement with a load to be lifted, and abutment means extending laterally from said load lifting member and overlying each of said flange means for engagement therewith to transmit any transverse forces directly to said strut, said flange means being disposed at an angle to each other so as to present relatively narrow corners thereof substantially to provide for line contact between said abutment means and said flange means.

5. An automobile jack, comprising an elongated strut having a generally channel-shaped cross section to provide a housing having an elongated frontal opening, means for supporting said strut in a generally upstanding position, an elongated screw rod disposed within said strut, bearing means adjacent the upper end of said strut rotatably supporting said screw rod, means for rotating said screw rod, a load lifting member threadedly engaging said screw rod and movable therealong upon rotation of said screw rod, a foot member secured to a lower end portion of said strut, said foot member including spaced front and rear walls, having generally parallel mid portions, disposed along front and rear surfaces of said strut, said front wall extending laterally and forwardly from opposite sides of said strut, and a bottom wall connecting lower marginal edges of said front and rear walls.

6. A load lifting jack, comprising a substantially channel-shaped strut member, a bracket member attached to an upper end portion of said channel-shaped strut member, said bracket member including an offset downwardly facing hollow portion, a leg member pivoted within and to said downwardly facing hollow portion and capable of swinging to an open position to maintain said channel-shaped strut member in a generally upright position, said bracket member having a portion formed as a bearing seat substantially covering the upper end of said channel-shaped strut member, bearing means mounted on said bearing seat, a threaded rod positioned in said channel-shaped member and supported by said bearing means, and a load lifting member threadedly mounted on said rod for movement longitudinally thereof when the rod is rotated.

7. A bracket for use with an automobile lifting jack having an elongated strut with a generally channel-shaped cross section and a screw mounted within said strut, said bracket comprising a portion providing a bearing seat adapted to cover an upper end of the jack strut, an attachment portion extending downwardly from said bearing seat portion and adapted to be secured to the back of the jack strut, a pair of portions extending downwardly from said bearing seat portion and adapted to be positioned generally along opposite sides of the jack strut, said pair of portions leaving a frontal opening of the channel-shaped jack strut substantially uncovered, at least one of said downwardly extending portions being adapted for interconnection with a support leg for said jack strut.

8. An automobile lifting jack, comprising an elongated strut having a generally channel-shaped cross section, said strut including a pair of spaced side walls and having an elongated frontal opening, elongated flange means extending inwardly from frontal longitudinal edge portions of each of said side walls, an elongated screw rod rotatably mounted within said strut, means for rotating said screw rod, load lifting means having a portion disposed within said channel-shaped strut and threadedly engaging said screw rod for movement along said screw rod upon rotation thereof, said load lifting means having another portion extending forwardly of said strut for engagement with a load to be lifted, abutment means extending laterally from said load lifting means and overlying each of said flange means for engagement therewith to transmit transverse forces directly to said strut, said flange means being disposed at an angle to each other so as to prevent relatively narrow corners thereof for engagement with said abutment means, and shoulder means extending laterally from the portion of the load lifting means within said channel-shaped strut for engagement with inwardly facing surfaces of said flange means to prevent said screw rod from being pulled out of the channel-shaped strut.

MILLARD B. LUCKER.

REFERENCES CITED

The following references are of record in the file of this patent:

UNITED STATES PATENTS

| Number | Name | Date |
| --- | --- | --- |
| 1,377,950 | Watson | May 10, 1921 |
| 1,424,952 | Townsend | Aug. 8, 1922 |
| 1,795,391 | Hansen | Mar. 10, 1931 |
| 2,043,479 | Greiman | June 9, 1936 |
| 2,125,493 | Foster | Aug. 2, 1938 |
| 2,274,794 | Kitchen | Mar. 3, 1942 |

FOREIGN PATENTS

| Number | Country | Date |
| --- | --- | --- |
| 404,650 | Germany | Oct. 22, 1924 |
| 637,310 | France | Jan. 28, 1928 |